Feb. 17, 1942. W. J. WRIGHTON ET AL 2,273,609
INDUCTION HEATING
Filed Oct. 31, 1939   2 Sheets-Sheet 1
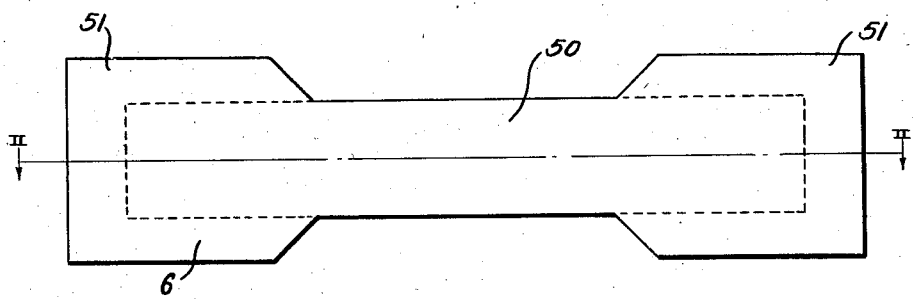
Fig. I
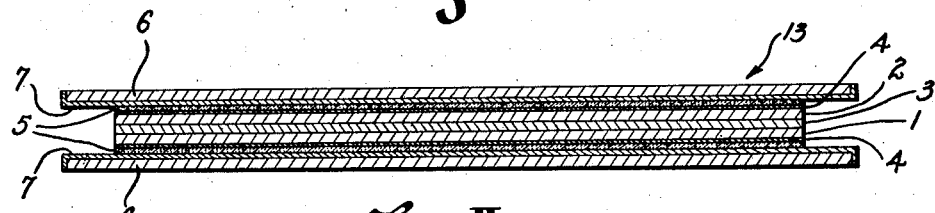
Fig. II
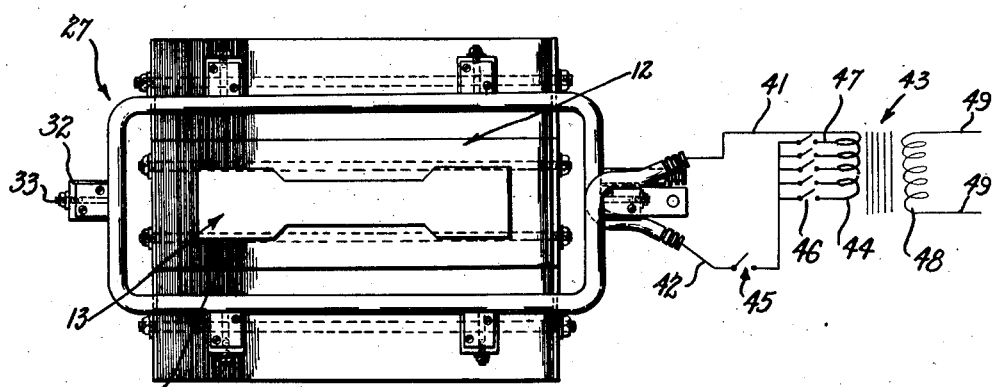
Fig. V
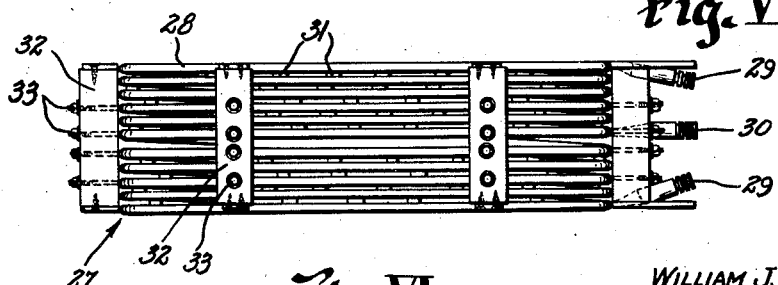
Fig. VI
INVENTOR.
WILLIAM J. WRIGHTON
BY  TRACY C. JARRETT
Harry H. Styll.
ATTORNEY.

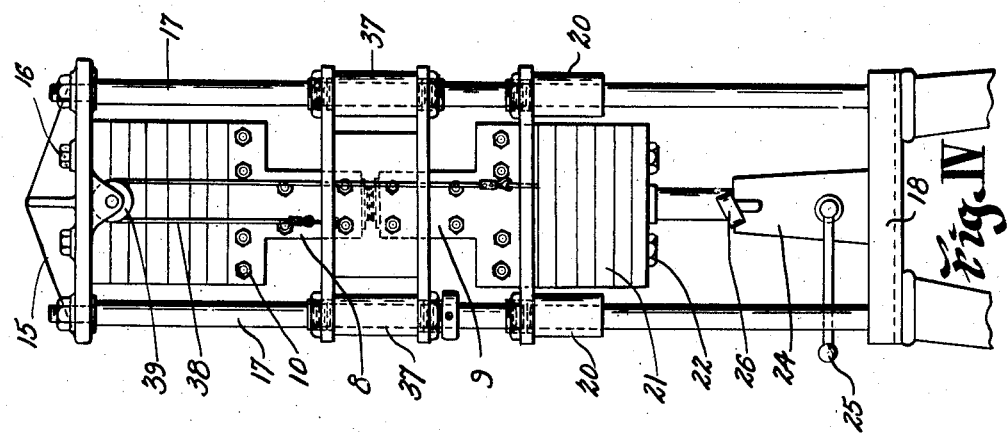
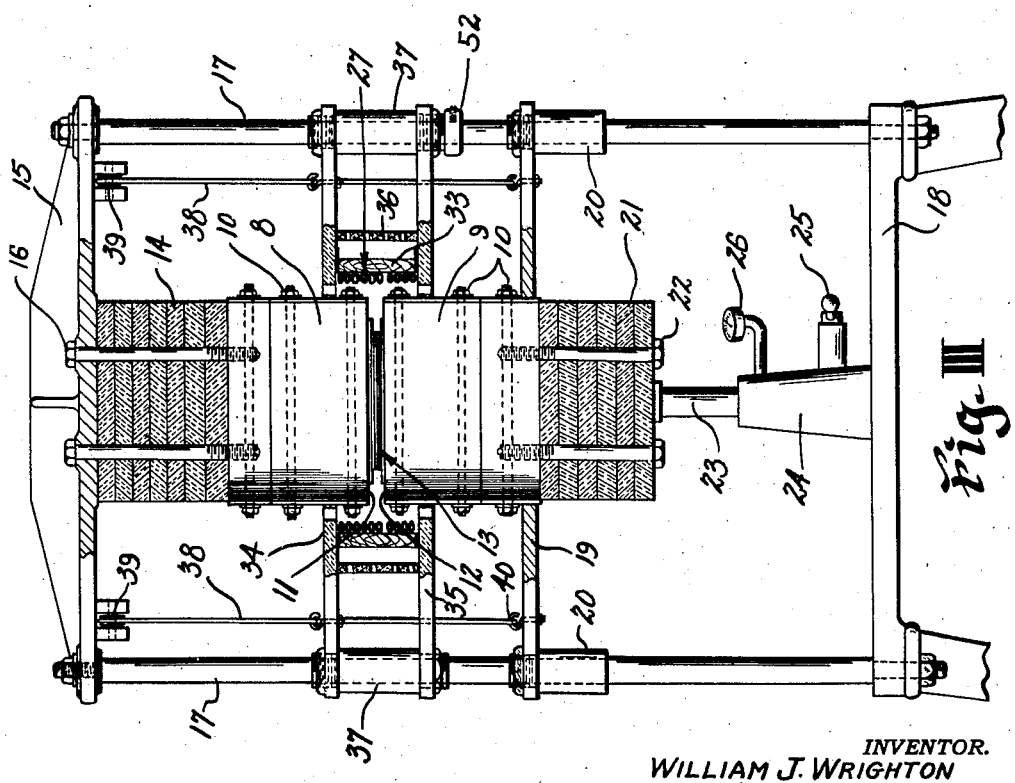

Patented Feb. 17, 1942

2,273,609

UNITED STATES PATENT OFFICE 2,273,609

INDUCTION HEATING

William J. Wrighton and Tracy C. Jarrett, Southbridge, Mass., assignors to American Optical Company, Southbridge, Mass., a voluntary association of Massachusetts Application October 31, 1939, Serial No. 302,210

2 Claims. (Cl. 219—13)

This invention relates to induction electric furnaces and has particular reference to improved means and method of heating through the use of such furnaces.

This application is a continuation-in-part of the earlier filed application having Serial No. 271,970, and being filed May 5, 1939.

One of the principal objects of the invention is to provide an improved means and method of heating with an induction electric furnace whereby the distribution of the heat in the means being heated by said furnace may be positively controlled.

Another object is to provide improved means and method of heating a laminated assembly which is to be joined by heat generated through the use of an induction electric furnace and associated means for substantially uniformly distributing heat throughout said laminated assembly.

Another object is to provide a novel apparatus, which is simple and efficient in its function for solder bonding separate associated members.

Another object is to provide improved means and method of forming an assembly of said associated members having a solder medium therebetween by applying pressure of a controlled amount to said members and subjecting them to inductive heat to cause the solder to melt or flow between the members and upon cooling to congeal and integrally unite same while held under controlled amount of pressure.

Another object is to provide a novel apparatus for heating work while holding said work under a given pressure whereby the heat will be substantially entirely generated in and will be substantially uniformly distributed throughout the work.

Another object is to provide a novel arrangement for controlling the temperature of heat generated.

Other objects and advantages of the invention will become apparent from the following description taken in connection with the accompanying drawings and it will be apparent that many changes may be made in the details of construction, arrangement of parts and steps of the process shown and described without departing from the spirit of the invention expressed in the accompanying claims. The invention, therefore, is not limited to the exact details of construction, arrangement of parts and steps of process shown and described as the preferred form only has been given by way of illustration.

Referring to the drawings:

Fig. I is a plan view of a composite limited assembly which is to be heated by the heating apparatus involving the invention and showing the means for controlling the distribution of heat to said assembly;

Fig. II is a longitudinal section view taken as on line II—II of Fig. I and looking in the direction indicated by the arrows;

Fig. III is a front elevation of the heating apparatus embodying the invention showing portions thereof in cross section;

Fig. IV is a side elevation of said apparatus;

Fig. V is a plan view of the heating coil and lower supporting jaw of the pressure apparatus with a diagrammatical illustration of the transformer and current control of the heating unit of said apparatus; and Fig. VI is a side elevation of the coil of the heating unit.

For ease of description the present invention will be described for use in joining a plurality of laminated members or layers of metal by soldering said layers together. It is to be understood, however, that the heating apparatus embodying the invention will be used for several different purposes.

In joining laminated members in the past it has been usual to hold the assembly together by separate clamp means whose function is to hold the parts in place for subsequent handling. The assembly held by such clamp means was placed in a furnace heated by gas or the like. These prior art furnaces were of such a nature that the heating of the lamination was by radiation and conduction and required a relatively long interval of time to produce a substantially uniform distribution of heat. With the prior art arrangement of heat the clamps or other supporting means for the assembly were necessarily heated. After such heating the laminated assembly was removed from the furnace and placed under a separate press. This shift of the laminated assembly from the furnace to the press had to be carried out in a relatively short interval of time so as to avoid having the parts cool sufficiently to cause the solder used in uniting the parts or lamination to congeal prior to being subjected to pressure and also includes the danger of having the parts move out of desired aligned relation with each other.

With such prior art procedure, particularly when gas furnaces and the like were used, heat temperatures and distribution of the heat could not be accurately controlled. There was danger of the work becoming overheated with the result that solder was burned or, in instances when a precious metal layer was being joined with a base layer, the metal would become too soft or molten. With such prior art devices, uniform pressure could not be applied while heating. All of these difficulties endangered the making of uniform solderings and in many instances during subsequent working of the joined laminations, the solder bond would not resist such workings and allowed portions of the laminations to become disunited. This was mostly due to the fact that the heat could not be substantially uniformly distributed through the parts being joined and even pressure could not be applied to said parts during said heating.

The essence of the present invention, therefore, is to provide an arrangement whereby pressure may be applied directly to the work during said heating, the heat definitely controlled and substantially equally distributed throughout the laminations or work during the heating thereof.

Referring more particularly to the drawings, wherein like characters of reference designate like parts throughout the several views the work or means which is to be heated as shown in Figs. I and II comprises a layer 1 of base metal and a layer 2 of precious metal such as gold and a layer 3 of solder therebetween. The layer 3 may be of hard solder or of any desirable joining material. In forming this assembly the surfaces to be joined by the solder are cleaned and properly fluxed. The flux may be of boric acid or other known suitable fluxes. The assembly thus formed is provided on the opposed sides thereof with a relatively thin layer of paper 4. Directly superimposed on said layers 4 there is provided layers 5 of heat resisting material such as asbestos or the like and are of a controlled given thickness. There is superimposed on these heat resisting layers 5 plates 6 of copper or the like of controlled given thicknesses and of controlled contour shapes and dimensions as compared with the shape and dimensions of the laminations to be joined. The plates 6 may be provided with a relatively thin inner facing 7 of stainless steel which lies between said plate 6 and heat resisting plates 5. To insure proper bonding at the edges of the assembly the said edges may be given a coat of similar flux as that used on the surfaces. This is applied to the edges after the parts or layers to be joined are in assembled relation with each other.

The assembly formed as specified above is then placed in the heating and compressing device embodying the invention such as illustrated in Figs. III to VI inclusive. This heating device comprises a pair of jaws 8 and 9 formed of a plurality of superimposed transformer iron laminations, that is, a plurality of thin metal plates held in superimposed relation with each other by connecting bolts or other means 10. These relatively thin metal plates or transformer iron laminations are so joined with each other as to form relatively flat and parallel faces 11 and 12 which are adapted to engage the work 13 to be heated, which in this particular instance is described as superimposed laminations having a layer of solder therebetween such as shown in Figs. I and II.

The jaw 8 is supported by insulation material 14 connected with a bracket 15 by brass bolts or the like 16. The bracket 15 is supported by a plurality of uprights 17 carried by a base 18. The jaw 9 is similarly supported by a bracket 19 having bearing members 20 which may be moved longitudinally of the upright 17. The jaw 9 has insulation material 21 secured thereto by brass bolts or the like 22 which is engaged by a plunger 23 of a hydraulic pump 24. The hydraulic pump 24 is supported on the base 18 and may be operated by a pump lever 25 or by an automatic means as desired. The said pump has a suitable indicator 26 associated therewith indicating the amount of pressure applied to the jaw 9.

It is to be noted that the assembly of work 13 is placed upon the lower jaw 9 and that pressure is applied thereto by the hydraulic compression pump 24 by moving the jaw upwardly into engagement with the upper jaw 8. Due to the fact that the faces 11 and 12 of the jaws are substantially parallel, substantially uniform pressure will be applied throughout. The total pressure which has been found from practice to be desirable is from 2000 to 3000 pounds. This pressure is suitable for use in hard soldering a precious metal layer to a base metal such as copper, nickel or silver.

An induction coil 27 such as shown in Fig. VI is supported so as to surround the laminations of the jaws 8 and 9 in the assembly 13. This induction coil is preferably formed of tubular material 28 bent so as to produce a plurality of superimposed coils of a rectangular shape of a size which will surround the jaw members 8 and 9 and the work or assembly 13 carried thereby. The coils contain a cool liquid such as water which is flowed inwardly thereof through the inlets 29. A suitable outlet 30 is provided whereby a continuous flow of the water or cooling liquid takes place. The cooling water or liquid is for the purpose of keeping the coil member 27 cool so that the resistance in the coil will be less and the resistance loss less. The superimposed coils 28 are held in spaced relation with each other by a plurality of spaced members 31 of heat resisting material such as asbestos or the like and by tie members 32 of insulation material such as wood or the like held in position by connecting bolts 33. The parts of the coil for the above are thereby joined into an integral unit which is supported by the spaced plates 34 and 35 of heat resisting material such as asbestos fabricated into a stiff plate like member commercially known as "Transite" board.

The coil is surrounded by walls 36 of similar material. These walls have a plurality of slotted openings therein. The plates 34 and 35 are connected adjacent the opposing ends thereof to sleeve members 37 operably mounted on the upright 17. The plate 34 is connected to a steel cable or the like 38 which extends over pulleys 39 carried by the upper bracket 15 as illustrated in Figs. III and IV. The cable 38 is attached at its opposite end 40 to the lower bracket 19. When the bracket 19 is lowered the cable 38 is adapted to draw the plates 34 and 35 and the coil 27 mounted therebetween upwardly so as to expose the upper face 12 of the jaw 9. When the jaw 9 is moved in the opposite direction or upwardly the coil and associated support will simultaneously move in a downward direction. A suitable stop collar 52 mounted on the upright 17 is adapted to limit the downward movement of the coil 27 and associated support therefor. The arrangement is such that when the jaws 8 and 9 engage the assembly 13 the said assembly will be located substantially centrally of the coil 27.

The coil members 27 are connected through suitable lead wires 41 and 42 to a transformer 43 capable of varying voltages and amperes. The lead wire 41 is connected to one end of the secondary coil 44 of the transformer. The lead wire 42 is provided with a line switch 45 of any desirable type. The said lead wire 42 is connected through the switch 45 to a plurality of switch members 46 which may be selectively opened or closed. That is, such members 46 are connected, as by the lead wire 47, to different taps on the transformer coil 44 so that different voltages may be obtained. The primary coil 48 of the transformer is connected by the lead wires 49 to any suitable source of A. C. electrical energy. It is to be noted that the plane of the transformer plates forming the jaws 8 and 9 is at substantially right angles to the longitudinal plane of the assembly 13 and the inductance coil 27. The purpose of this arrangement is to concentrate the high amperage circulating current in the assembly 13. The circulating current generates heat energy in the assembly 13. The flow of the current passing through the assembly of work generates the heat and the extent of this current is controlled by the switch member 46. Change of the distance between the jaws 8 and 9 necessitates change in the voltage used and is controlled by closing the proper switch of the transformer 48.

The switch 45 may be of the commercially known time switch type as desired whereby the length of exposure of the assembly 13 to the inductance coil may be controlled. The assembly comprising the jaws 8 and 9 and inductance coil 27, is of the lower frequency type, approximately 60 cycles, so that heat is generated in a relatively short time interval. This type transformer and assembly may be designed for any of the commercial power frequencies. Commercial power frequencies are used because of great depth of penetration of the current. With this type of heating unit maximum useful heat is generated only in the assembly 13. The purpose of using insulation material 14 and 21, and the use of brass bolts for joining laminations 8 and 9 to insulating material, is to diminish and isolate the magnetic field.

The copper plates 6 illustrated in Figs. I and II are for the purpose of controlling the distribution of the current in the assembly 13. By changing the shape of the plates 6 a different distribution of the current is obtained so that the shape of such plates is a factor controlling the substantially uniform distribution of heat throughout the assembly. It has been found that the operation of the field of inductance can be definitely controlled by the shape of the plates 6. It is to be noted that in this particular instance the plates 6 are formed with a central portion 50 substantially the same width as the width of the laminations 1 and 2. The ends 51 of said plates are enlarged so as to protrude considerably beyond the opposed ends of said assembly. The purpose of forming the central portion 50 of the plates 6 with a width less than the width of the ends is to avoid overheating the assembled laminations 1, 2, and 3 throughout the central area thereof. It has been found from past practice that should the plates 6 be formed rectangular in shape and of substantially the same shape as the layers to be joined, an excessive amount of heat will be generated in the center or heat of a lower intensity will be generated at the ends. In order to balance the distribution of heat, the plates are reduced in width through the center area thereof. By controlling the width of the center area in proportion to the width of the end areas 51 a substantially uniform amount of heat may be generated throughout the entire assembly. The shape of plates 6, therefore, depends on the shape of the laminations which are to be united or which are to be joined. In instances when the work is of the nature set forth herein, that is, a laminated assembly having a layer of hard solder therebetween, heat is generated to a temperature which is above the melting point of the solder. Immediately upon the detection of the flow of the solder the electrical current is shut off, either automatically or manually. The assembly is then allowed to cool while held under pressure by the hydraulic pump 24. This is also true of soft solder. It is also to be noted that during the soldering operation pressure is maintained substantially constant.

In forming the assembly 13 the relatively thin sheets of paper 4 are positioned between the layers 5 and the immediate surface of the laminations 1 and 2 which are to be joined for the purpose of preventing the asbestos layers from adhering to the outer surfaces of the assembly after the soldering operations have been completed. The stainless steel facings 7 on the copper plates 6 are for the purpose of preventing any solder which may flow outwardly from adhering to the plates 6.

Although the device embodying the invention has been shown and described as being used for solder uniting laminated assemblies, it is to be understood that said heating apparatus may be put to any desirable use such as for heating dies for hardening purposes, for use in brazing operations, for melting metals, or for any desirable heat treatment.

Although the plurality of relatively thin transformer iron laminations are specified as being used in forming the jaw members 8 and 9, it is to be noted that these laminations constitute part of the induction furnace and function cooperatively with the coil 27 in generating the heat desired.

From the foregoing description it will be seen that simple, efficient and economical means and methods have been provided for accomplishment of all of the objects and advantages of the invention, particularly that of generating heat through induction and controlling the distribution of said heat.

Having described our invention, we claim:

1. The process of substantially uniformly solder uniting an assembly of superposed metallic plates comprising placing a sheet of bonding material between the adjacent surfaces of a layer of precious metal and a layer of non-precious metal, forming heater strips of heat conducting metal each to a controlled shape and size with respect to the shape and size of the metallic strips to be solder united so that the said heater strips will have a central area of a width no greater than the greatest width of the metallic layers to be solder united and each having end areas greater than the adjacent end areas of said layers with the said end portions of said strips protruding outwardly of the sides and ends of the adjacent portions of said layers, said central area and end areas of said heater strips being so proportioned according to the respective adjacent areas of the strips as to cause substantially uniform heat distribution throughout the total area of said strips, a further step of subjecting the superposed metallic members and the heater strips to uniform compression while inductively heating the superposed metallic members and the heater strips until the bonding material reaches a melting temperature to the end that the superposed metallic members to be soldered together are thoroughly compressed while the bonding material is in a state of flux and holding the superposed metallic members under compression until after the bonding material has set.

2. The process of substantially uniformly solder uniting an assembly of superposed metallic plates comprising placing a sheet of bonding material between the adjacent surfaces of a layer of precious metal and a layer of non-precious metal, forming heater strips of heat conducting metal each to a controlled shape and size with respect to the shape and size of the metallic strips to be solder united so that the said heater strips will have a central area of a width no greater than the greatest width of the metallic layers to be solder united and each having end areas greater than the adjacent end areas of said layers with the said end portions of said strips protruding outwardly of the sides and ends of the adjacent portions of said layers, said central area and end areas of said heater strips being so proportioned according to the respective adjacent areas of the strips as to cause substantially uniform heat distribution throughout the total area of said strips, placing said heater strips on the opposed sides of the assembly to be solder united so that the said heater strips and layers will be in proper relation with each other to bring about said substantially uniform heat distribution, subjecting the assembly thus formed to substantially uniform compression throughout the areas of the metallic layers to be solder united and subjecting said assembly to inductive heating while maintaining compression on said metallic strips to be solder united.

WILLIAM J. WRIGHTON.
TRACY C. JARRETT.